(12) United States Patent
Yoneyama (10) Patent No.: US 7,106,800 B2
(45) Date of Patent: Sep. 12, 2006

(54) IMAGE SIGNAL DECODER SELECTIVELY USING FRAME/FIELD PROCESSING

(75) Inventor: Akira Yoneyama, Higashiosaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 548 days.

(21) Appl. No.: 10/696,299

(22) Filed: Oct. 29, 2003

(65) Prior Publication Data

US 2004/0086049 A1    May 6, 2004

Related U.S. Application Data

(62) Division of application No. 09/586,038, filed on Jun. 2, 2000, now Pat. No. 6,697,431.

(30) Foreign Application Priority Data

Jun. 4, 1999 (JP) ............................. 11-158566

(51) Int. Cl.
*H04N 7/12* (2006.01)
(52) U.S. Cl. ................................. 375/240.26
(58) Field of Classification Search .......... 375/240.01, 375/240.12, 240.13, 240.25, 240.26; H04N 7/12
See application file for complete search history.

(56) References Cited

U.S. PATENT DOCUMENTS 4,219,854 A  8/1980 Church et al.

5,430,490 A  7/1995 Rim

FOREIGN PATENT DOCUMENTS

| EP | 0 595 544 A3 | 5/1994 |
|----|----|----|
| EP | 0 935 396 A2 | 11/1999 |
| GB | 2 277 005 A | 12/1994 |
| JP | 55-84020 | 6/1980 |
| JP | 10-233992 A | 9/1998 |

OTHER PUBLICATIONS

ISO/IEC DIS 11172, "Coding of Moving Pictures and Associated Audio ISO/IEC JTC1/SC29 WG11.".
ISO/IEC 13818-2, "Coding of Audio, Picture, Multimedia and Hypermedia Information." (1995 E).

*Primary Examiner*—Young Lee
(74) *Attorney, Agent, or Firm*—Akin Gump Strauss Hauer & Feld, LLP (57) ABSTRACT

On input coded data, variable length decoding is performed, and motion vector information extracted. The motion vector information is transmitted to the threshold value determination section, and a predetermined threshold value and the value of the motion vector information are compared. Based on the number of motion vector information whose values are the threshold value or more, it determines whether it is necessary to control the interframe motion or not. When the control is necessary because the interframe motion is large, the control signal generation section generates a control signal to suspend the decoding by the varibale length decoding section and thereby reducing a frame rate.

1 Claim, 8 Drawing Sheets

IMAGE SIGNAL DECODER SELECTIVELY USING FRAME/FIELD PROCESSING

BACKGROUND OF THE INVENTION

The present invention relates to an image signal decoder for decoding a coded image signal and converting to the previous image signal of the coding, and an image signal display system for decoding a coded image signal, converting to the previous image signal of the coding, and displaying the image signal on a display device, and a liquid crystal display (hereinafter, referred to as LCD) is used as the display device.

Examples of the known apparatuses which highly efficiently code or decode image signals are based on the standards such as the ISO/IEC 13818-2 "Coding of Audio, Picture, Multimedia and Hypermedia Information" and ISO/IEC DIS 11172 "Coding of Moving Pictures and Associated Audio ISO/IEC JTC1/SC29 WG11".

Figure 6:
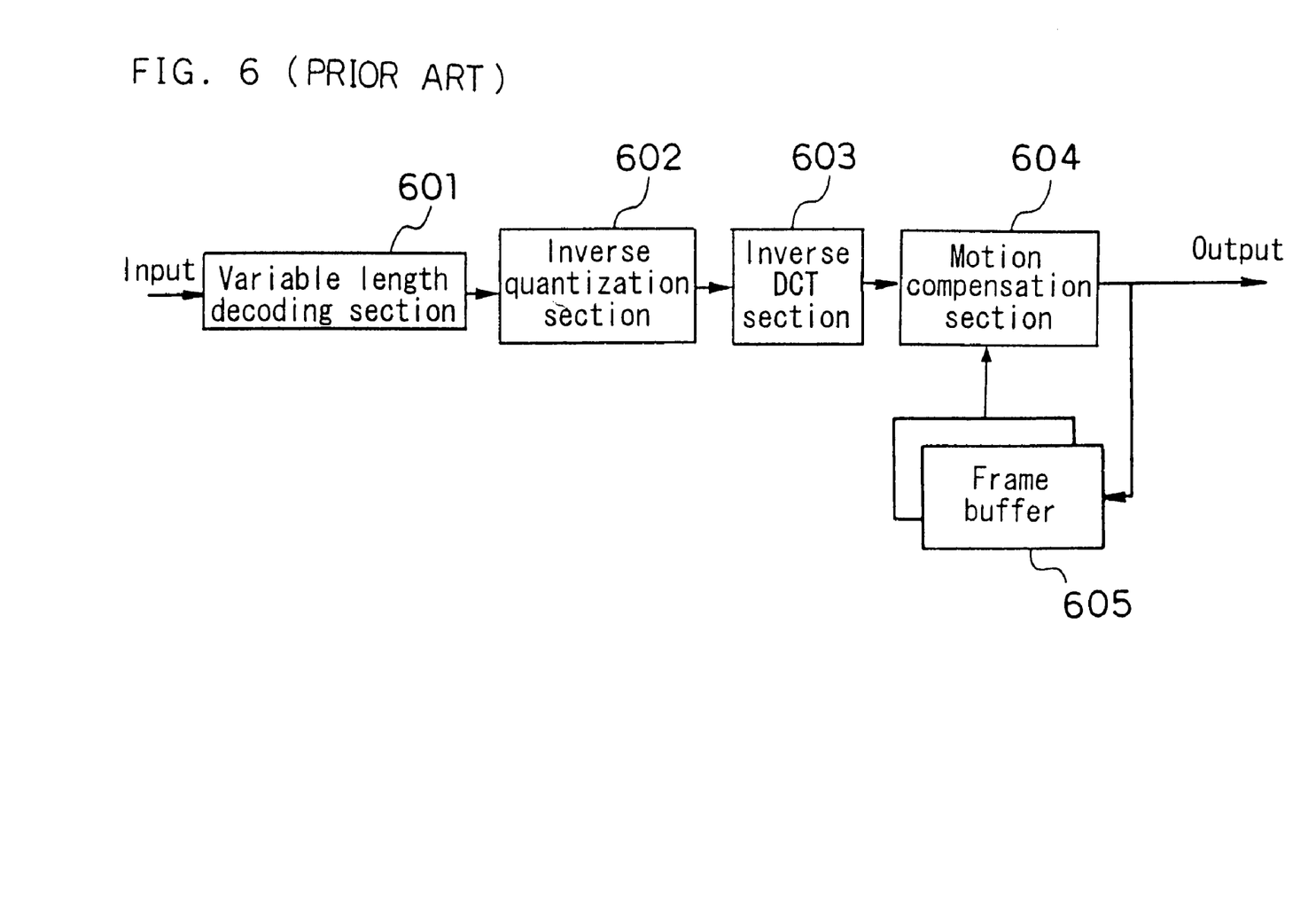
FIG. 6 is the block diagram showing the configuration of the conventional image signal decoder.

A conventional apparatus for decoding the image signal (hereinafter is referred to as image signal decoder) will be described with reference to FIG. 6. FIG. 6 is a block diagram showing the example of the conventional apparatus for decoding the image signal. In FIG. 6, the output terminal of a variable length decoding section 601 to which a coded image signal is input is connected to the input terminal of an inverse quantization section 602. The output terminal of the inverse quantization section 602 is connected to the input terminal of an inverse discrete cosine transform (hereinafter, referred to as DCT) section 603. The output terminal of the inverse DCT section 603 is connected to the input terminal of a motion compensation section 604. The output terminal of the motion compensation section 604 is connected to the input terminal of a frame buffer 605. The output terminal of the frame buffer 605 is connected to the input terminal of the motion compensation section 604. A decoded image signal is output from the output terminal of the motion compensation section 604.

Decoding operation of the conventional image signal decoder configured above will be described. The input image signal is image data highly efficiently coded based on the ISO/IEC 13818-2 (hereinafter, referred to as coded data). On the input coded data, variable length decoding is performed by the variable length decoding section 601. By the variable length decoding, the following pieces of information are extracted: motion vector information for motion compensatio; coded image signal coefficient information; time information for playback stored in the header; and header information representative of the coding mode of each frame and the like.

The coefficient information includes quantized coefficient data and quantization scale data used for the quantization. On the coefficient information, inverse quantization is performed by the inverse quantization section 602, so that the coefficient information is restored to the original DCT coefficient information which was converted into the coefficient information through quantization. On the DCT coefficient information, inverse DCT is performed by the inverse DCT section 603, so that the DCT coefficient information is converted into the original pixel value information which was converted into the DCT coefficient information through orthogonal transformation.

When the pixel value information is that of a frame on which intra-frame coding is performed (hereinafter, referred to as I frame), the pixel value information is output without undergoing the motion compensation by the motion compensation section 604. When the pixel value information is that of a frame on which forward predictive coding is performed (hereinafter, referred to as P frame) or of a frame on which bidirectional predictive coding is performed (hereinafter, referred to as B frame), the pixel value information undergoes the motion compensation. That is, the converted pixel value information undergoes the motion compensation by the motion compensation section 604 by use of the motion vector information extracted by the variable length decoding section 601, and are successively output in accordance with the time information for playback. Determining the coding mode of the frame of the pixel value information, which has been, converted by the inverse DCT section 603 (whether the frame is the I frame, the P frame or the B frame) is made based on the header information.

When the pixel value information output from the motion compensation section 604 is that of the I frame or the P frame, it is temporarily stored in the frame buffer 605 so that it is used for the next motion compensation. The frame buffer 605 is capable of storing a maximum of two frames of reference data so that bidirectionally predictive-coded data can be decoded. The frame buffer 605 has a ring buffer configuration in which when the newest frame data is input, it is stored by overwriting the frame data being oldest in time with it.

In this manner, an image signal coded by a hybrid coding method that uses both intra-frame coding and interframe coding is decoded into pixel value information and is output to the display device.

A conventional image signal display system for displaying a decoded image signal on a display device will be described with reference to FIG. 7 and FIG. 8. This image signal display system is disclosed, for example, in Japanese Laid-open Patent Application No. Hei 10-11021.

Figure 7:
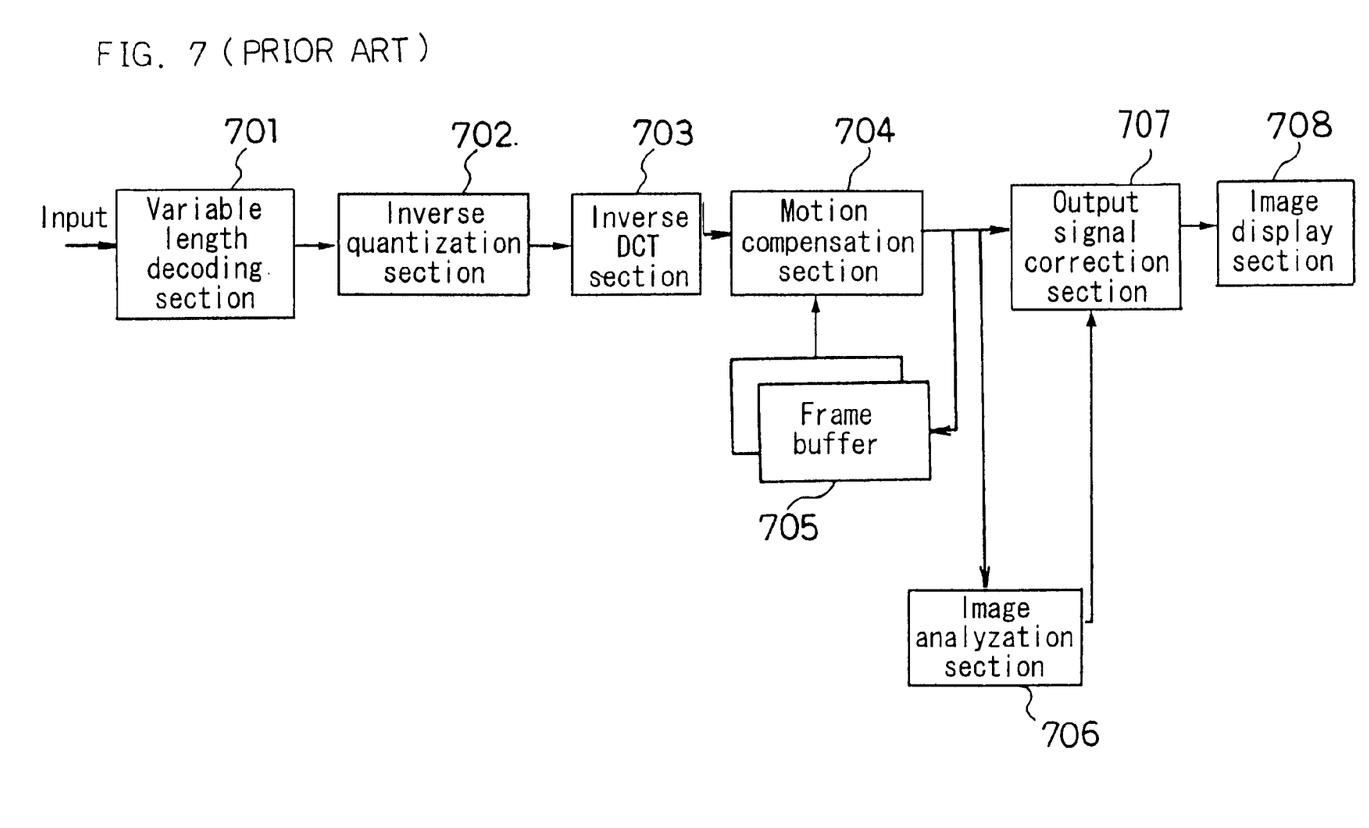
FIG. 7 is the block diagram showing the configuration of the conventional image signal display system.

FIG. 7 is a block diagram showing the configuration of the conventional image signal display system. In FIG. 7, the output terminal of a variable length decoding section 701 to which coded data is input is connected to the input terminal of an inverse quantization section 702. The output terminal of the inverse quantization section 702 is connected to the input terminal of an inverse DCT section 703. The output terminal of the inverse DCT section 703 is connected to the input terminal of a motion compensation section 704. The output terminal of the motion compensation section 704 is connected to a frame buffer 705, an image analyzation section 706 and an output signal correction section 707. The output terminal of the frame buffer 705 is connected to the input terminal of the motion compensation section 704. The output terminal of the image analyzation section 706 is connected to the input terminal of the output signal correction section 707. An output image signal of the output signal correction section 707 is input to an image display section 708.

Figure 8:
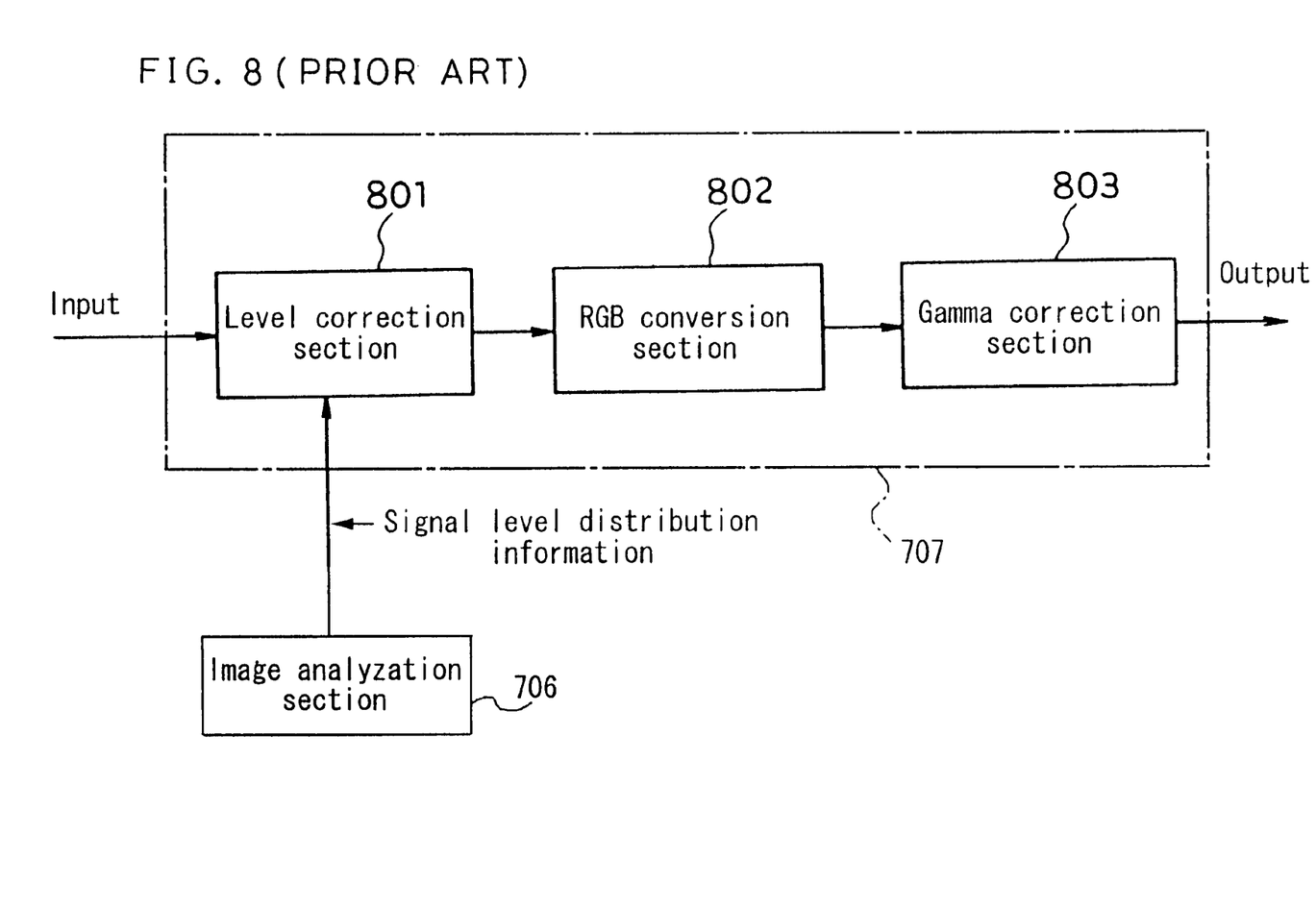
FIG. 8 is the block diagram showing the configuration of the output signal correction section of the conventional image signal display system.

FIG. 8 is a block diagram showing the configuration of the output signal correction section 707. In FIG. 8, the image signal and signal level distribution information described later are input to a level correction section 801. The output terminal of the level correction section 801 is connected to the input terminal of an RGB conversion section 802. The output terminal of the RGB conversion section 802 is connected to a gamma correction section 803.

Next, the operation of the conventional image signal display system will be described with reference to FIG. 7. On the input coded data, variable length decoding is performed by the variable length decoding section 701. By the variable length decoding, the following pieces of information are extracted: motion vector information for motion compensation; coded image signal coefficient information;

time information for playback stored in the header; and header information representative of the coding mode of each frame and the like.

The coefficient information extracted by the variable length decoding section 701 includes quantized coefficient data and quantization scale data used for the quantization. On the coefficient information, inverse quantization is performed by the inverse quantization section 702, so that the coefficient information is restored to the original DCT coefficient information which was converted into the coefficient information through quantization.

On the DCT coefficient information restored by the inverse quantization section 702, inverse DCT is performed by the inverse DCT section 703, so that the DCT coefficient information is restored to the original pixel value information which was converted into the DCT coefficient information through orthogonal transformation. When the pixel value information converted by the inverse DCT section 703 is that of the I frame, the pixel value information is output without undergoing the motion compensation by the motion compensation section 704. When the pixel value information is that of the P frame or the B frame, the pixel value information undergoes the motion compensation by the motion compensation section 704 by use of the motion vector information extracted by the variable length decoding section 701. Then, the pixel value information is successively output in accordance with the time information extracted by the variable length decoding section 701.

The coding mode of the frame of the pixel value information converted by the inverse DCT section 703 is determined based on the header information extracted by the variable length decoding section 701.

When the pixel value information output from the motion compensation section 704 is that of the I frame or the P frame, it is temporarily stored in the frame buffer 705 so that it is used for the next motion compensation. The frame buffer 705 is capable of storing a maximum of two frames of reference data so that bidirectionally predictive-coded data can be decoded. The frame buffer 705 has a ring buffer configuration in which when the newest frame data is input, it is stored by overwriting the frame data being oldest in time with it.

The image analyzation section 706 analyzes the pixel value information output from the motion compensation section 704, and generates intra-frame signal level distribution information (e.g. information such as the maximum signal level, the minimum signal level and an average signal level). Based on the signal level distribution information output from the image analyzation section 706, the output signal correction section 707 performs output correction on the pixel value information output from the motion compensation section 704. For example, the pixel value information output from the motion compensation section 704 is input to the level correction section 801 of the output signal correction section 707. Concurrently, to the level correction section 801, the signal level distribution information is input from the image analyzation section 706. Based on the signal level distribution information, the level correction section 801 corrects (contrast correction or level correction) the pixel value information so that the maximum and the minimum levels of the pixel value information are the same as the maximum and the minimum output levels that can be displayed by the image display device, respectively.

The pixel value information (image signal) output from the level correction section 801 is converted into RGB signals by the RGB conversion section 802. On the RGB signals, input and output correction (gamma correction) responsive to characteristics of the image display device is performed by the gamma correction section 803. In this manner, the coded data is decoded into an image signal conforming to the characteristics of the display device, is output to the image display section 708 and is displayed, for example, on an LCD monitor.

Examples of conventional image signal decoders for decoding coded image signals include playback-only apparatuses such as video CD players and DVD players. Moreover, dedicated decoder boards intended for playback on personal computers, and decoder software that realizes playback processing in the form of software are known. The image signal display system uses, as the display device, a TV monitor using a TV picture tube, a monitor using a display cathode ray tube (hereinafter, referred to as CRT), an LCD monitor, or a monitor using a plasma display panel (hereinafter, referred to as PDP).

In recent years, for saving space, an image signal display system using a flat-panel LCD monitor or PDP monitor has been required. In an image signal display system using an LCD monitor as the image display device, image quality is degraded due to characteristics inherent in LCD monitors. Since LCD monitors are low in response speed, afterimages are apt to be formed when a vigorously moving picture is displayed. Moreover, since LCD monitors provide display by the dot-matrix method, interlace interference occurs when the image signal of the interlace method is displayed. In addition, since LCD monitors are low in screen illuminance, the displayed image is low in contrast and dark.

BRIEF SUMMARY OF THE INVENTION

An object of the present invention is to provide an image signal display system using an LCD monitor, solving the above-mentioned problems inherent in LCD monitors and being capable of providing display of an image quality equal to that provided by TV monitors and CRT monitors, and to provide an image signal decoder for use in the image signal display system.

An image signal decoder according to the present invention is provided with a variable length decoding section for performing variable length decoding on an input image signal coded by a hybrid coding method that uses both intra-frame coding and interframe coding, and generating motion vector information, coefficient information, time information and header information. The image signal decoder is further provided with an interframe motion determination section for storing the motion vector information output from the variable length decoding section, and determining a magnitude of an interframe motion based on a distribution of the motion vector information. When determining that the interframe motion is large, the interframe motion determination section performs control so that the decoding by the variable length decoding section is suspended. The image signal decoder is further provided with: an inverse quantization section for performing inverse quantization on the coefficient information output from the variable length decoding section; and an inverse DCT section for performing inverse DCT on the inversely quantized coefficient information output from the inverse quantization section. The image signal decoder is further provided with: a motion compensation section for performing motion compensation based on the inversely discrete-cosine-transformed coefficient information output from the inverse DCT section and the motion vector information, and generating an output image signal; and a frame buffer for temporarily storing the output image signal output from the motion compensation section.

According to this image signal decoder, the interframe motion determination section detects the interframe motion based on the distribution condition of the motion vector information. When the interframe motion determination section determines that the interframe motion is large, the frame rate is decreased by suspending the processing by the variable length decoding section. Consequently, the formation of afterimages can be suppressed when a played back image is displayed on an LCD monitor.

An image signal decoder according to another aspect of the present invention is provided with a variable length decoding section for performing variable length decoding on an input image signal coded by a hybrid coding method that uses both intra-frame coding and interframe coding, and generating motion vector information, coefficient information, time information and header information. The image signal decoder is further provided with a decode control section for determining a magnitude of an interframe motion based on the motion vector information and the coefficient information output from the variable length decoding section and the number of bits per frame. When determining that the interframe motion is large, the decode control section suspends the decoding by the variable length decoding section. The image signal decoder is further provided with: an inverse quantization section for performing inverse quantization on the coefficient information output from the variable length decoding section; an inverse DCT section for performing inverse DCT on the inversely quantized coefficient information output from the inverse quantization section; a motion compensation section for performing motion compensation based on the inversely discrete-cosine-transformed coefficient information output from the inverse DCT section and the motion vector information, and generating an output image signal; and a frame buffer for temporarily storing the output image signal output from the motion compensation section.

According to this image signal decoder, the decode control section determines the interframe motion based on the distribution condition of the motion vector information, the number of generated bits per frame and quantization information included in the coefficient information. When the decode control section determines that the interframe motion is large, the frame rate is decreased by suspending the processing in the variable length decoding section. Consequently, the formation of afterimages can be suppressed when a played back image is displayed on an LCD monitor.

An image signal decoder according to still another aspect of the present invention uses both intra-frame coding and interframe coding. The image signal decoder is provided with a variable length decoding section for performing variable length decoding on an input image signal coded by a hybrid coding method that selectively uses frame processing or field processing for each coding unit, and generating motion vector information, coefficient information, time information and header information. The image signal decoder is further provided with a frame/field processing detection-section for determining whether the currently performed coding is performed in units of frames or in units of fields based on the motion vector information and the coefficient information output from the variable length decoding section. The image signal decoder is further provided with; an inverse quantization section for performing inverse quantization on the coefficient information output from the variable length decoding section; and an inverse DCT section for performing inverse DCT on the inversely quantized coefficient information output from the inverse quantization section. The image signal decoder is further provided with: a motion compensation section for performing motion compensation based on the inversely discrete-cosine-transformed coefficient information output from the inverse DCT section and the motion vector information, and generating a first output image signal; a frame buffer for temporarily storing the first output image signal output from the motion compensation section; and a field interpolation section for, when the frame/field processing detection-section determines that the coding is performed in units of fields, interpolating one of field data of the first output image signal output from the motion compensation section, and generating a second output image signal. The image signal decoder is further provided with an output switching section for performing control so that the first output image signal from the motion compensation section is output when the frame/field processing detection-section determines that the coding is performed in units of frames, and that the second output image signal from the field interpolation section is output when the frame/field processing detection-section determines that the coding is performed in units of fields.

According to this image signal decoder, the frame/field processing detection-section determines whether the coding is performed in units of frames or in units of fields for each coding unit. When it is performed in units of fields, the frame/field processing detection-section determines that there is an intra-field motion in the area, and the field interpolation section produces a second output image signal by interpolation and outputs it. Consequently, the occurrence of interlace interference can be suppressed when a played back image is displayed on an LCD monitor.

An image signal display system according to the present invention is provided with a variable length decoding section for performing variable length decoding on an input image signal coded by a hybrid coding method that uses both intra-frame coding and interframe coding, and generating motion vector information, coefficient information, time information and header information. The image signal display system is further provided with: an inverse quantization section for performing inverse quantization on the coefficient information output from the variable length decoding section; and a DC level distribution information detection section for temporarily storing only DC component information of the inversely quantized coefficient information output from the inverse quantization section, generating distribution information of the DC component information corresponding to one frame, and outputting the generated distribution information. The image signal display system is further provided with: an inverse DCT section for performing inverse DCT on the inversely quantized coefficient information output from the inverse quantization section; and a motion compensation section for performing motion compensation based on the inversely discrete-cosine-transformed coefficient information output from the inverse DCT section and the motion vector information, and generating a first output image signal. The image signal display system is further provided with: a frame buffer for temporarily storing the first output image signal output from the motion compensation section; an output signal correction section for correcting the first output image signal output from the motion compensation section based on the distribution information of the DC component information output from the DC level distribution information detection section, and generating a second output image signal; and an image display section for displaying the second output image signal output from the output signal correction section.

According to the image signal display system, the DC level distribution information detection section produces the distribution information of the DC component corresponding to one frame in decoding, and the distribution information is used for the output signal correction of the decoded image signal. Consequently, image analysis conventionally performed after decoding is unnecessary, so that the overall processing amount can be reduced and the apparatus scale can be reduced. In addition, even in the case where an LCD monitor is used as the display device, high quality display is realizable so as to be similar to the use of a TV monitor or a CRT monitor as the display device.

DETAILED DESCRIPTION OF THE INVENTION

Preferred embodiments of the image signal decoder of the present invention will hereinafter be described with reference to FIG. 1 to FIG. 5.

[First Embodiment]

Figure 1:
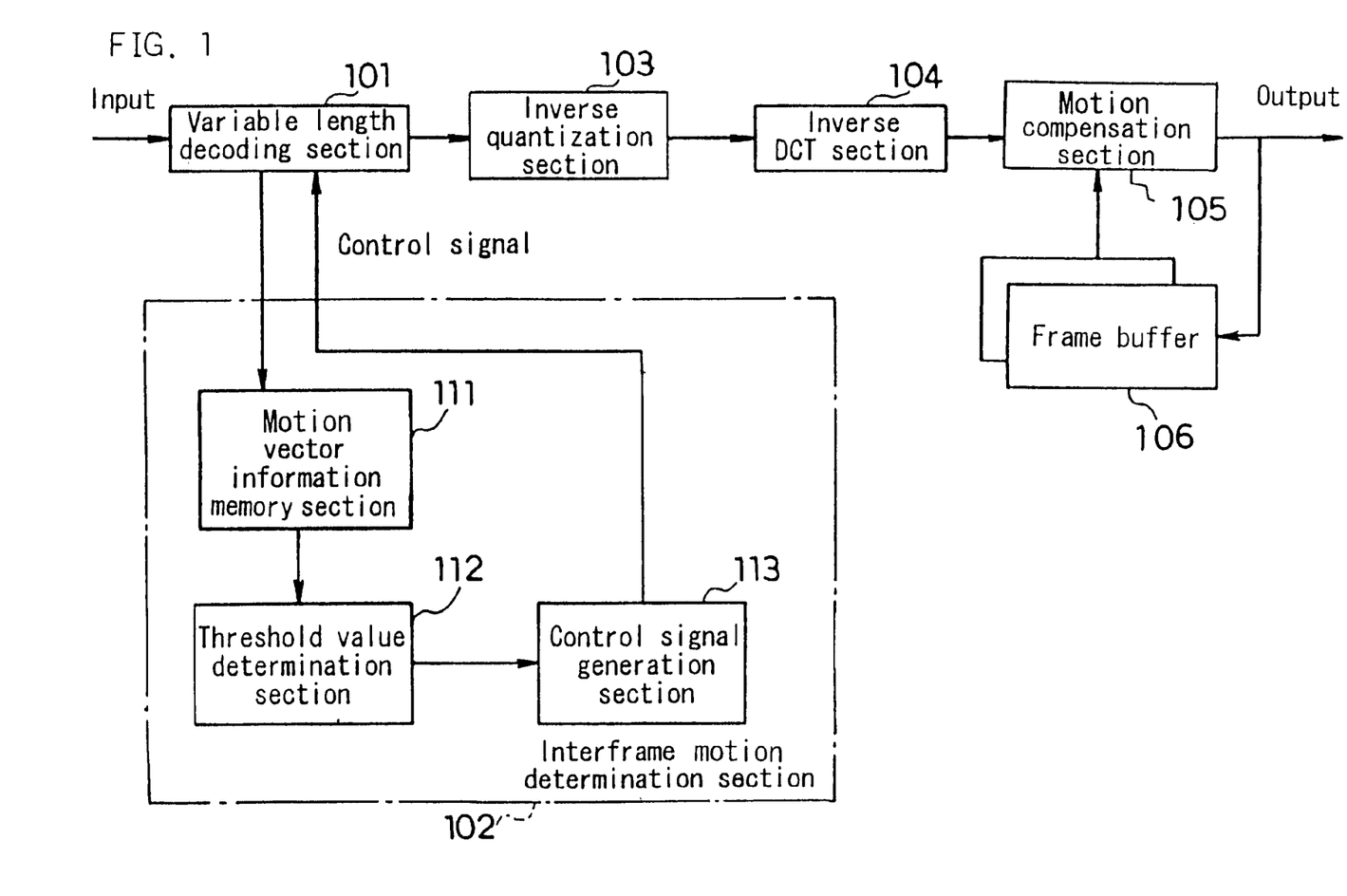
FIG. 1 is a block diagram showing the configuration of an image signal decoder according to a first embodiment of the present invention.

FIG. 1 is a block diagram of an image signal decoder according to the first embodiment of the present invention.

In FIG. 1, the output terminal of a variable length decoding section 101 to which a coded image signal is input is connected to the input terminal of an interframe motion determination section 102 and to the input terminal of an inverse quantization section 103. The output terminal of the interframe motion determination section 102 is connected to the input terminal of the variable length decoding section 101. The output terminal of the inverse quantization section 103 is connected to the input terminal of an inverse DCT section 104. The output terminal of the inverse DCT section 104 is connected to the input terminal of a motion compensation section 105. The output terminal of the motion compensation section 105 is connected to the input terminal of a frame buffer 106. A decoded image signal is output from the output terminal of the motion compensation section 105.

The interframe motion determination section 102 includes a motion vector information memory section 111 for storing motion vector information output from the variable length decoding section 101, a threshold value determination section 112 for determining the motion of an image between the current frame and the immediately preceding frame, and a control signal generation section 113 for generating a control signal to control the operation of the variable length decoding section 101 based on the result of the determination by the threshold value determination section 112.

The operation of the image signal decoder of the first embodiment configured above will be described. Like in the conventional examples, the input image signal is coded data. On the input coded data, variable length decoding is performed by the variable length decoding section 101. By the variable length decoding, the following pieces of information are extracted: motion vector information for motion compensation; coded image signal coefficient information; time information for playback stored in the header; and header information representative of the coding mode of each frame and the like. The motion vector information extracted by the variable length decoding section 101 is temporarily stored in the interframe motion determination section 102 and used for the interframe motion determination.

The motion vector information extracted by the variable length decoding section 101 is temporarily stored in the motion vector information memory section 111 in the interframe motion determination section 102. The motion vector information stored in the motion vector information memory section 111 is transmitted to the threshold value determination section 112, and a predetermined threshold value and the value of the motion vector data are compared. The threshold value determination section 112 counts the number of motion vector data whose values are the threshold value or more, and determines based on the number whether it is necessary to control the interframe motion or not.

The control signal generation section 113 receives the result of the determination from the threshold value determination section 112. When the received determination result is that the control is necessary because the interframe motion is large, the control signal generation section 113 generates a control signal to suspend the decoding by the variable length decoding section 101, and outputs the generated control signal. The control signal is not output for decoding of a frame serving as a reference frame for decoding (I frame or P frame), but is output only for variable length decoding the data of the B frame so that the decoding is suspended.

The coefficient information extracted by the variable length decoding section 101 includes quantized coefficient data and quantization scale data used for the quantization. On the coefficient information, inverse quantization is performed by the inverse quantization section 103, so that the coefficient information is restored to the original DCT coefficient information which was converted into the coefficient information through quantization. On the DCT coefficient information restored by the inverse quantization section 103, inverse DCT is performed by the inverse DCT section 104, so that the DCT coefficient information is converted into the original pixel value information which was converted into the DCT coefficient information through orthogonal transformation.

When the pixel value information converted by the inverse DCT section 104 is that of the I frame, the pixel value information is output without undergoing the motion compensation by the motion compensation section 105.

When the pixel value information is that of the P frame or the B frame, the pixel value information undergoes the motion compensation by the motion compensation section 105 by use of the motion vector information extracted by the variable length decoding section 101, and is successively output in accordance with the time information extracted by the variable length decoding section 101. The coding mode of the pixel value information converted by the inverse DCT section 104 is determined based on the header information extracted by the variable length decoding section 101.

When the pixel value information output from the motion compensation section 105 is that of the I frame or the P frame, it is temporarily stored in the frame buffer 106 so that it is used for the next motion compensation. The frame buffer 106 is capable of storing a maximum of two frames of reference data so that bidirectionally predictive-coded data can be decoded. The frame buffer 106 has a ring buffer configuration in which when the newest frame data is input, the newest frame data is stored by overwriting the frame data being oldest in time with it.

As described above, according to the image signal decoder of the first embodiment, when the interframe motion determination section determines that the interframe motion is large, the frame rate is decreased by suspending the processing by the variable length decoding section. Consequently, the formation of afterimages can be suppressed when a played back image is displayed on an LCD monitor being low in response speed.

[Second Embodiment]

Figure 2:
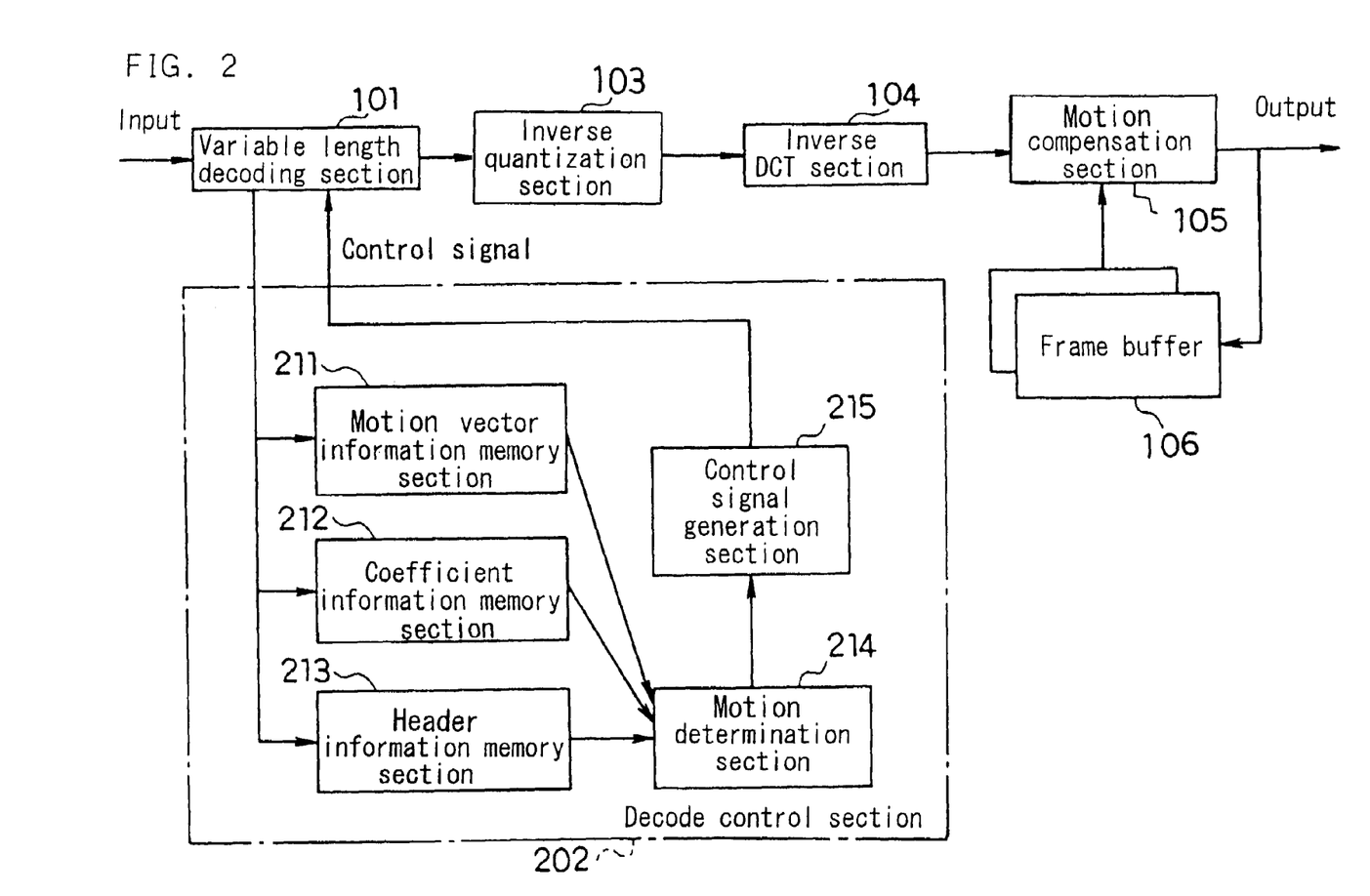
FIG. 2 is a block diagram showing the configuration of an image signal decoder according to a second embodiment of the present invention.

FIG. 2 is a block diagram of an image signal decoder according to the second embodiment of the present invention. In the image signal decoder of the second embodiment, only the interframe motion determination section 102 of the first embodiment is replaced by a decode control section 202. Therefore, like parts are designated by like reference numerals, and overlapping descriptions are omitted.

In FIG. 2, the decode control section 202 of the image signal decoder of the second embodiment include a motion vector information memory section 211, a coefficient information memory section 212 and a header information memory section 213 for storing the motion vector information, the coefficient information and the header information output from the variable length decoding section 101, respectively. The decode control section 202 also includes a motion determination section 214 for determining the interframe motion based on the respective information stored in the memory sections 211, 212 and 213, and a control signal generation section 215 for generating a control signal for the decoding by the variable length decoding section 101 in accordance with the result of the determination by the motion determination section 214.

The operation of the image signal decoder of the second embodiment will be described hereafter.

On the input coded data, variable length decoding is performed by the variable length decoding section 101. By the variable length decoding, the following information are extracted: motion vector information for motion compensation; coded image signal coefficient information; time information for playback stored in the header; and header information representative of the coding mode of each frame and the like.

In the decode control section 202, the motion vector information extracted by the variable length decoding section 101 is temporarily stored in the motion vector information memory section 211. The coefficient information is temporarily stored in the coefficient information memory section 212. The header information is temporarily stored in the header information memory section 213. The stored motion vector information, coefficient information and header information are each read out and transmitted to the motion determination section 214, and whether an interframe motion is present or absent is determined.

In a scene where the interframe motion is large, the prediction error is large because the accuracy of the motion compensation in the coding is low, so that the value of the generated DCT coefficient data is high. Consequently, when the quantization is performed at a quantization level similar to other scenes where the motion is small, the number of bits is large. Since the processings by means of the inverse DCT section and succeeding sections cannot be performed when the number of bits is large, it is necessary to perform the quantization at a coarse quantization level in order to decrease the number of bits. Moreover, since the relationship between the quantization level and the number of bits at this time is also affected by the difference of the coding mode such as the bidirectional predictive coding or the forward predictive coding, the header information is also important as a determination condition.

In view of these, the motion determination section 214 determines that a period where the, amount of the generated DCT coefficient information is large in a predictive-coded frame is the period where an interframe motion is present, based on the distribution condition of the magnitude of the motion vector, quantization level information, number-of-bits information and the header information.

When the motion determination section 214 determines that the interframe motion is large, the control signal generation section 215 generates a decode skip command signal to suspend the decoding by the variable length decoding section 101, and outputs the generated signal. The decode skip command signal is not output for the decoding of the I frame or the P frame data serving as a reference frame for decoding, but is output only for the B frame data so that the variable length decoding is suspended.

The coefficient information extracted by the variable length decoding section 101 includes quantized coefficient data and quantization scale data used for the quantization. On the coefficient information, inverse quantization is performed by the inverse quantization section 103, so that the coefficient information is restored to the original DCT coefficient information which was converted into the coefficient information through quantization. On the DCT coefficient information restored by the inverse quantization section 103, inverse DCT is performed by the inverse DCT section 104, so that the DCT coefficient information is converted into the original pixel value information which was converted into the DCT coefficient information through orthogonal transformation. When the converted pixel value information is that of the I frame, the pixel value information is output without undergoing the motion compensation by the motion compensation section 105. When the pixel value information is that of the P frame or the B frame, the pixel value information undergoes the motion compensation by the motion compensation section 105 by use of the motion vector information extracted by the variable length decoding section 101, and is successively output in accordance with the time information extracted by the variable length decoding section 101.

The coding mode in the coding of the pixel value information converted by the inverse DCT section 104 is determined based on the header information extracted by the variable length decoding section 101. When the pixel value information output from the motion compensation section 105 is that of the I frame or the P frame, the pixel value information is temporarily stored in the frame buffer 106 so that the pixel value information is used for the next motion compensation. The frame buffer 106 has a capacity capable of storing a maximum of two frames of reference data so that bidirectionally predictive-coded data can be decoded. The frame buffer 106 has a ring buffer configuration in which when the newest frame data is input, the newest frame data is stored by overwriting the frame data being oldest in time with it.

As described above, according to the image signal decoder of the second embodiment, the decode control section detects the interframe motion based on the distribution condition of the motion vector information, the number of bits per frame, and the quantization information included in the coefficient information. When it is determined that the interframe motion is large, the frame rate is decreased by suspending the processing by the variable length decoding section. Consequently, the formation of afterimages can be suppressed when a played back image is displayed on an LCD monitor.

[Third Embodiment]

Figure 3:
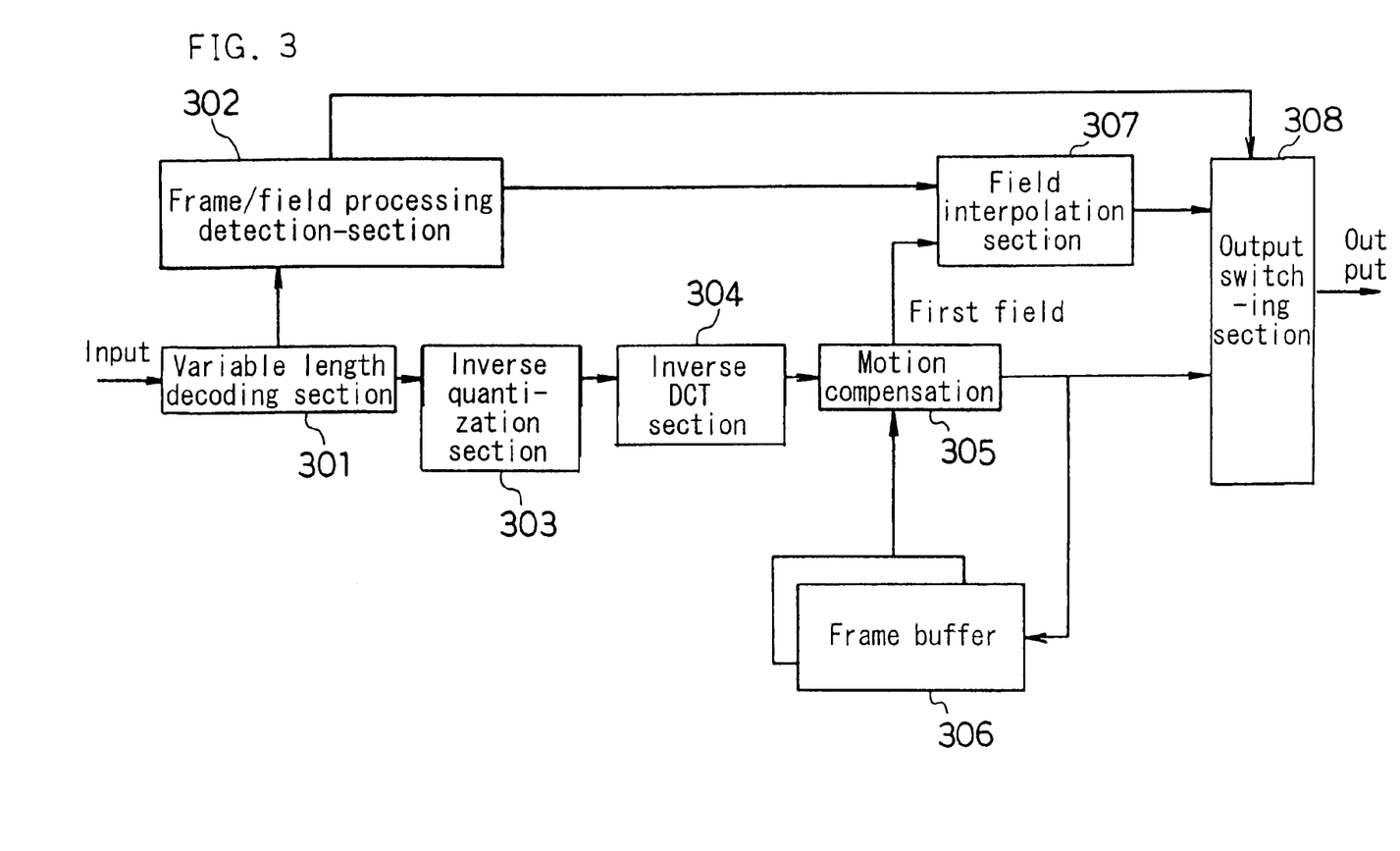
FIG. 3 is a block diagram showing the configuration of an image signal decoder according to a third embodiment of the present invention.

FIG. 3 is a block diagram of an image signal decoder according to the third embodiment of the present invention.

In FIG. 3, the output terminal of a variable length decoding section 301 to which coded data is input is connected to a frame/field processing detection-section 302 and to an inverse quantization section 303. The output terminal of the inverse quantization section 303 is connected to the input terminal of an inverse DCT section 304. The output terminal of the inverse DCT section 304 is connected to the input terminal of a motion compensation section 305. The output terminal of the motion compensation section 305 is connected to the input terminals of a frame buffer 306, a field interpolation section 307 and an output switching section 308. The output terminal of the frame buffer 306 is connected to the input terminal of the motion compensation section 305.

The output terminal of the frame/field processing detection-section 302 is connected to the input terminals of the field interpolation section 307 and the output switching section 308. The output terminal of the field interpolation section 305 is connected to the input terminal of the output switching section 308. A decoded image signal is output from the output terminal of the output switching section 308 to a display device.

The operation of the image signal decoder of the third embodiment will be described hereafter. In the following description, the input coded data is data coded based on the MPEG2 (Moving Picture Experts Group phase 2) standard. According to the MPEG2 standard, whether coding is performed in units of frames or in units of fields can be decided for each coding unit (hereinafter, referred to as macro block). This is because the coding efficiency is higher when field processing is performed for a motion area where there is an intra-field motion (area where data is different between fields) and frame processing is performed for a motionless area where there is no intra-frame motion.

On the input coded data, variable length decoding is performed by the variable length decoding section 301, and the following information are extracted: motion vector information for motion compensation; coded image signal coefficient information; time information for playback stored in the header; and header information representative of the coding mode of each frame and the like. Based on the extracted coefficient information and motion vector information, the frame/field processing detection-section 302 detects whether each macro block is a frame-processed one or a field-processed one, and outputs the result of the detection. That is, the motion area in the frame can be detected by detecting whether the macro block is frame-processed or field-processed in decoding the data coded according to the MPEG2 standard.

The coefficient information extracted by the variable length decoding section 301 includes quantized coefficient data and quantization scale data used for the quantization. On the coefficient information, inverse quantization is performed by the inverse quantization section 303, so that the coefficient information is restored to the original DCT coefficient information which was converted into the coefficient information through quantization.

On the DCT coefficient information restored by the inverse quantization section 303, inverse DCT is performed by the inverse DCT section 304, so that the DCT coefficient information is converted into the original pixel value information which was converted into the DCT coefficient information through orthogonal transformation. When the pixel value information converted by the inverse DCT section 304 is that of the I frame, the pixel value information is output without undergoing the motion compensation by the motion compensation section 305. When the pixel value information is that of the P frame or the B frame, the pixel value information undergoes the motion compensation by the motion compensation section 305 by use of the motion vector information extracted by the variable length decoding section 301, and is successively output in accordance with the time information extracted by the variable length decoding section 301.

The coding mode by which the pixel value information converted by the inverse DCT section 304 is coded is determined based on the header information extracted by the variable length decoding section 301. When the pixel value information output from the motion compensation section 305 is that of the I frame or the P frame, the pixel value information is temporarily stored in the frame buffer 306 so that the pixel value information is used for the next motion compensation. The frame buffer 306 has a capacity capable of storing a maximum of two frames of reference data so that bidirectionally predictive-coded data can be decoded. The frame buffer 306 has a ring buffer configuration in which when the newest frame data is input, the newest frame data is stored by overwriting the frame data being oldest in time with it.

When the frame/field processing detection-section 302 determines that the macro block is field-processed, the field interpolation section 307 performs field interpolation on the pixel value information output from the motion compensation section 305. The field interpolation section 307 produces frame data, for example, by interpolating only one of the field data of the input pixel value information, and outputs a second output image signal. As another method of producing field data by interpolation, new frame data may be produced by filtering both of the field data.

In accordance with the result of the determination by the frame/field processing detection-section 302, the output switching section 308 outputs the first output image signal itself of the motion compensation section 305 with regard to the data of the frame-processed macro block. With regard to the data of the field-processed macro block, the output switching section 308 outputs the second output image signal produced by the field interpolation section 307.

As described above, according to the image signal decoder of the third embodiment, the frame/field processing detection-section determines that there is an intra-field motion in the area when the macro block is field-processed. Then, the field interpolation section 307 produces frame data by interpolation and outputs the second output image signal. Consequently, the occurrence of interlace interference can be suppressed when a played back image is displayed on an LCD monitor.

[Fourth Embodiment]

Figure 4:
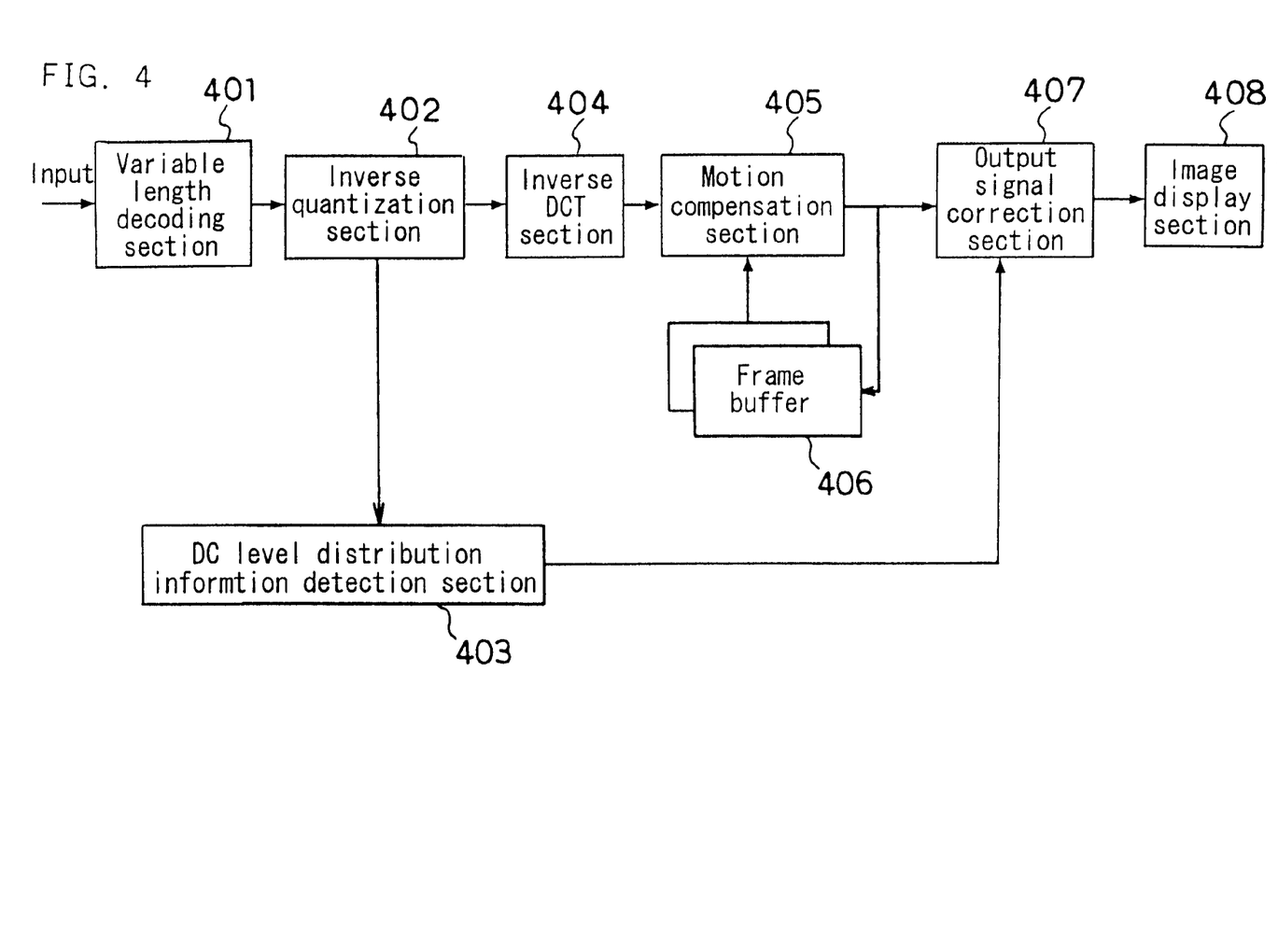
FIG. 4 is a block diagram showing the configuration of an image signal display system according to a fourth embodiment of the present invention.

FIG. 4 is a block diagram showing the configuration of an image signal display system according to the fourth embodiment of the present invention. In FIG. 4, the output terminal of a variable length decoding section 401 to which coded data is input is connected to the input terminal of an inverse quantization section 402. The output terminal of the inverse quantization section 402 is connected to a DC level distribution information detection section 403 and to an inverse DCT section 404. The output terminal of the inverse DCT section 404 is connected to the input terminal of a motion compensation section 405. The output terminal of the motion compensation section 405 is connected to the input terminal of a frame buffer 406 and to the input terminal of an output signal correction section 407. The output terminal of the frame buffer 406 is connected to the input terminal of the motion compensation section 405. The output terminal of the output signal correction section 407 is connected to an image display section 408. The output terminal of the DC level distribution information detection section 403 is connected to the input terminal of the output signal correction section 407. The image display section 408 is an LCD monitor.

Figure 5:
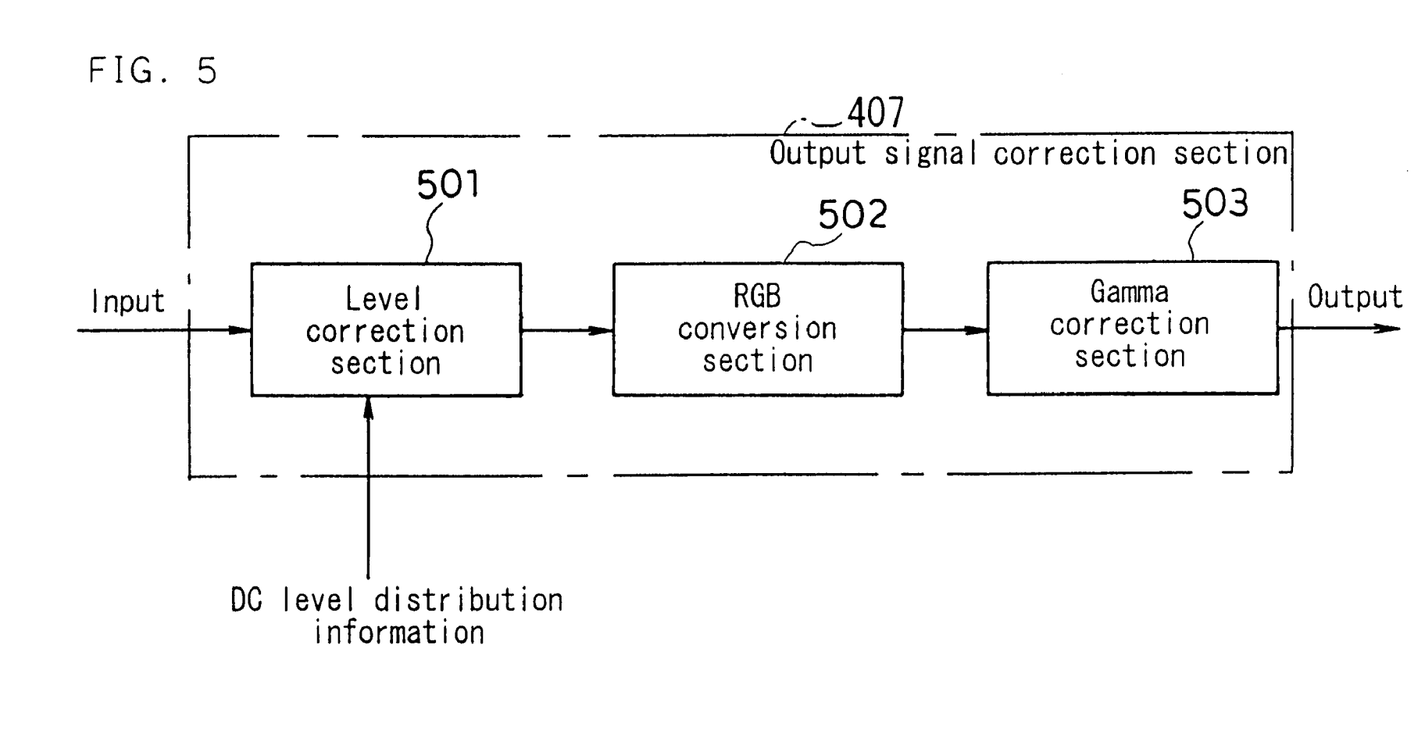
FIG. 5 is a block diagram showing the configuration of an output signal correction section in the image signal display system according to the fourth embodiment of the present invention.

FIG. 5 is a block diagram showing the internal configuration of the output signal correction section 407 in the image signal display system of the fourth embodiment. In FIG. 5, the output signal correction section 407 includes a level correction section 501 for correcting the level of the input pixel value information signal to a level that can be displayed by the image display device 408, an RGB conversion section 502 for converting the pixel value information signal into RGB signals, and a gamma correction section 503 for performing gamma correction responsive to characteristics of the image display device 408 on the RGB signals.

The operation of the image signal display system of the fourth embodiment will be described with reference to FIG. 4 and FIG. 5. On the input coded data, variable length decoding is performed by the variable length decoding section 401. By the variable length decoding, the following information are extracted: motion vector information for motion compensation; coded image signal coefficient information; time information for playback stored in the header; and header information representative of the coding mode of each frame and the like. The coefficient information extracted by the variable length decoding section 401 includes quantized coefficient data and quantization scale data used for the quantization. On the coefficient information, inverse quantization is performed by the inverse quantization section 402, so that the coefficient information is restored to the original DCT coefficient information which was converted into the coefficient information through quantization. The DC level distribution information detection section 403 temporarily stores only DC component information of the DCT coefficient information restored by the inverse quantization section 402, and produces DC component level distribution information (e.g. information such as the maximum value, the minimum value and the average value of the DC component) corresponding to one frame.

On the DCT coefficient information restored by the inverse quantization section 402, inverse DCT is performed by the inverse DCT section 404, so that the DCT coefficient information is converted into the original pixel value information which was converted into the DCT coefficient information through orthogonal transformation. When the pixel value information converted by the inverse DCT section 404 is that of the I frame, the pixel value information is output without undergoing the motion compensation by the motion compensation section 405. When the pixel value information is that of the P frame or the B frame, the pixel value information undergoes the motion compensation by the motion compensation section 405 by use of the motion vector information extracted by the variable length decoding section 401, and is successively output in accordance with the time information extracted by the variable length decoding section 401. The coding mode, in the coding, of the pixel value information converted by the inverse DCT section 404 is determined based on the header information extracted by the variable length decoding section 401.

When the pixel value information output from the motion compensation section 405 is that of an I frame or a P frame, it is temporarily stored in the frame buffer 406 so that it is used for the next motion compensation. The frame buffer 406 has a capacity capable of storing a maximum of two frames of reference data so that bidirectionally predictive-coded data can be decoded. The frame buffer 406 has a ring buffer configuration in which when the newest frame data is input, the newest frame data is stored by overwriting the frame data being oldest in time with it.

Based on the DC level distribution information of the DC component information input from the DC level distribution information detection section 403, the output signal correction section 407 performs output signal correction on the pixel value information output from the motion compensation section 405. For example, the pixel value information output from the motion compensation section 405 is corrected (contrast correction or level correction) by the level correction section 501 shown in FIG. 5 so that the maximum and the minimum levels of the input signal are the same as the maximum and the minimum output levels that can be displayed by the display device, respectively, based on the DC level distribution information of the DC component information input from the DC level distribution information detection section 403. The pixel value information (image signal) output from the level correction section 501 is converted into RGB signals by the RGB conversion section 502. On the RGB signals, input and output correction (gamma correction) responsive to characteristics of the display device is performed by the gamma correction section 503, and are output to the image display section 408.

According to the image signal display system of the fourth embodiment, the DC level distribution information detection section produces DC level distribution information corresponding to one frame in decoding, and the distribution information is used for the output signal correction of the decoded image signal. Consequently, image analysis conventionally performed after decoding is unnecessary, so that the overall processing amount can be reduced and the apparatus scale can be reduced.

According to the image signal decoder of the present invention, in decoding a coded image signal and displaying the decoded image signal, the frame rate is decreased by suspending the decoding by the variable length decoding section when the interframe motion is large. Consequently, the formation of afterimages can be suppressed when a played back image is displayed on the LCD monitor.

According to the image signal display system of the present invention, even in a display system using the LCD monitor as the display device, the quality of display is improved to a level equal to that provided by the display system using the TV monitor or the CRT monitor as the display device. In addition, since the output signal correction section is included to perform output signal correction on the decoded image signal, image analysis is unnecessary. Consequently, the overall processing amount of the image signal display system can be reduced and the system scale can be reduced.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. An image signal decoder for decoding an input image signal coded by a hybrid coding method using both intra-frame coding and interframe coding, and selectively using frame processing or field processing for each coding unit, comprising:

a variable length decoding section for performing variable length decoding on said input image signal, and generating motion vector information, coefficient information, time information and header information;

a frame/field processing detection-section for determining whether said input image signal being currently processed is coded in units of frames or in units of fields based on said motion vector information and said coefficient information output from said variable length decoding section;

an inverse quantization section for performing inverse quantization on said coefficient information output from said variable length decoding section;

an inverse DCT section for performing inverse DCT on said inversely quantized coefficient information output from said inverse quantization section;

a motion compensation section for performing motion compensation based on said inversely discrete-cosine-transformed coefficient information output from said inverse DCT section and said motion vector information, and generating a first output image signal;

a frame buffer for temporarily storing said first output image signal output from said motion compensation section;

a field interpolation section for, when said frame/field processing detection-section determines that said input image signal is coded in units of fields, interpolating one of field data of said first output image signal output from said motion compensation section, and generating a second output image signal; and an output switching section for performing control so that said first output image signal from said motion compensation section is output when said frame/field processing detection-section determines that said input image data is coded in units of frames, and that said second output image signal from said field interpolation section is output when said frame/field processing detection-section determines that said input image data is coded in units of fields.

* * * * *